United States Patent [19]

Egawa et al.

[11] Patent Number: 4,932,789
[45] Date of Patent: Jun. 12, 1990

[54] RADIATION CLINICAL THERMOMETER

[75] Inventors: Shunji Egawa, Saitama; Masato Yamada, Tokyo, both of Japan

[73] Assignee: Citizen Watch Co., Ltd., Tokyo, Japan

[21] Appl. No.: 335,616

[22] Filed: Apr. 10, 1989

[51] Int. Cl.⁵ .......................... G01J 5/10; G01K 7/00; G01K 1/20

[52] U.S. Cl. .................................... 374/126; 128/664; 128/736; 374/129; 374/128; 374/130; 374/132; 374/133; 374/170

[58] Field of Search ............... 374/126, 129, 121, 164, 374/170, 128, 130, 132, 133, 2; 128/664, 736

[56] References Cited

U.S. PATENT DOCUMENTS

| | | |
|---|---|---|
| 3,586,439 | 6/1971 | Treharne et al. ................ 374/126 |
| 4,471,354 | 9/1984 | Smith .............................. 28/736 |
| 4,495,415 | 1/1985 | Kawabata ...................... 250/336.1 |
| 4,602,642 | 7/1986 | O'Hara et al. ................. 374/126 |
| 4,634,294 | 1/1987 | Christol et al. ............... 374/130 |
| 4,669,049 | 5/1987 | Kosednar et al. ............. 374/170 |
| 4,722,612 | 2/1988 | Junkert et al. ................ 374/133 |
| 4,743,122 | 5/1988 | Yamano et al. ................ 374/128 |
| 4,784,149 | 11/1988 | Berman et al. ................ 374/129 |
| 4,790,324 | 12/1988 | O'Hara et al. ................. 374/126 |
| 4,797,840 | 1/1989 | Fraden ........................... 128/736 |

OTHER PUBLICATIONS

"Latest Trends in Temperature and Humidity Sensor", *Sensor Technique*, Sep. 1987, pp. 74-79 (translation included).

*Primary Examiner*—William A. Cuchlinski, Jr.
*Assistant Examiner*—Diego F. F. Gutierrez
*Attorney, Agent, or Firm*—Townsend and Townsend

[57] ABSTRACT

A radiation clinical thermometer includes a probe, a detection signal processing section, a body temperature operating section, and a display unit. A filter correction section for setting a correction value based on the transmission wavelength characteristics of a filter is arranged. The body temperature operating section receives infrared data, temperature-sensitive data, and the correction value from the filter correction section so as to calculate body temperature data.

23 Claims, 12 Drawing Sheets

RADIATION CLINICAL THERMOMETER

BACKGROUND OF THE INVENTION

1. Field of the Invention

The present invention relates to a portable, compact radiation clinical thermometer for measuring a temperature upon insertion in an external ear canal.

2. Description of the Prior Art

Recently, a pen type electronic clinical thermometer has been widely used in place of a glass clinical thermometer.

This electronic clinical thermometer is not fragile, can perform a digital display which is easy to read, and can generate an alarm sound such as a buzzer sound for signaling the end of temperature measurement. However, this clinical thermometer requires about 5 to 10 minutes for temperature measurement, i.e., substantially the same length of time as that required by a glass clinical thermometer. This makes a user feel that body temperature measurement is cumbersome. Such a long measurement time is based on a method of inserting a sensor portion in an armpit or a mouth and bringing it into contact with a portion to be measured. A measurement time is prolonged due to the following two reasons:

(1) A skin temperature at an armpit or a mucous membrane temperature in a mouth is not equal to a body temperature prior to temperature measurement, and gradually reaches the body temperature after the armpit or the mouth is closed.

(2) Since the sensor portion of the clinical thermometer has been cooled down to an ambient temperature, when it is inserted in a portion to be measured, the temperature of the portion is further lowered.

Temperature measurement of a conventional clinical thermometer will be described with refence to FIG. 1.

FIG. 1 shows temperature measurement curves of a contact type electronic clinical temperature. In FIG. 1, temperature measurement time is plotted along the axis of abscissa and measurement temperatures are plotted along the axis of ordinate. A curve H represents a temperature curve of an armpit as a portion to be measured; and a curve M, a measurement temperature curve obtained by the clinical thermometer. Accordingly, the skin temperature of the armpit is 36° C. or less at measurement start time $t_1$, and the temperature of a clinical thermometer sensor portion is cooled to 30° C. or less. When the sensor portion is inserted in the armpit in this state, and the armpit is closed, the measurement temperature represented by the curve M of the sensor portion is quickly raised. However, the temperature represented by the curve H of the armpit begins to rise gradually toward an actual body temperature $T_b$ after it is cooled by the sensor portion to a temperature at time $t_2$. The two temperature curves H and M coincidentally rise from time $t_3$ when the sensor portion is warmed to the skin temperature of the armpit. As described above, however, it takes about 5 to 10 minutes for the curve to reach the actual body temperature. As is known, a method of measuring a body temperature is performed in practice as follows. Measurement is performed from time $t_1$ at predetermined intervals. The measurement values are compared with each other, and maximum values are sequentially stored. At the same time, a difference between the measurement values is sequentially checked. The instant when the difference becomes smaller than a predetermined value is set at time $t_4$, and the temperature measurement is stopped. Thus, the greatest value at this time is displayed as a body temperature (e.g., Japanese Patent Laid-Open (Kokai) No. 50-31888).

In consideration of the above-described reasons (1) and (2), conditions for performing body temperature measurement within a short period of time are: selection of a portion having a body temperature prior to measurement, and an actual measurement without bringing a cooled sensor portion into contact with the portion to be measured.

A drum membrane is, therefore, selected as a portion having a body temperature prior to measurement, and a radiation clinical thermometer is proposed as a clinical thermometer for measuring the temperature of the portion in a nontact manner (e.g., U.S. Pat. No. 3,282,106).

The principle of a radiation thermometer on which the above radiation clinical thermometer is based will be described below.

A radiation thermometer is based on a law of physics, i.e., "all objects emit infrared radiation from their surfaces, and the infrared radiation amounts and the spectral characteristics of the objects are determined by their absolute temperatures as well as their properties and states of their finished surfaces." This law will be described with reference to the following laws.

The Planck's law states a relationship between the radiant intensity, spectral distribution, and temperature of a blackbody as follows:

$$W(\lambda, T) = 2\pi c^2 h/\lambda^5 (e^{hc/k\lambda T} - 1)^{-1} \quad (1)$$

where $W(\lambda,T)$: spectral radiant emittance [W/cm²·μm]
T: absolute temperature of blackbody [K]
λ: wavelength of radiation [μm]
c: velocity of light = $2.998 \times 10^{10}$ [cm/sec]
h: Planck's constant = $6.625 \times 10^{-34}$ [W.sec²]
k: Boltzmann constant = $1.380 \times 10^{23}$ [W.sec/K]

FIG. 3 shows the Planck's law. As is apparent from FIG. 3, as the temperature of the blackbody rises, the radiation energy is increased. In addition, the radiation energy varies depending on wavelengths. The peak value of the radiant emittance distribution shifts to the short wavelength side with an increase in temperature, and radiation occurs over a wide wavelength band.

Total energy radiated from the blackbody can be obtained by integrating $W(\lambda,T)$ given by equation (1) with respect to λ from $\lambda=0$ to $\lambda=\infty$. This is the Stefan-Boltzmann law.

$$W_1 = \int_0^\infty W(\lambda,T)d\lambda - \sigma T^4 \quad (2)$$

$W_1$: total energy radiated from blackbody [W/cm²]
σ: Stefan-Boltzmann constant = $5.673 \times 10^{12}$ [W/cm²·deg⁴]

As is apparent from equation (2), the total radiation energy $W_1$ is proportional to a power of four of the absolute temperature of the blackbody light source. Note that equation (2) is obtained by integrating the infrared radiation emitted from the blackbody with respect to all the wavelengths.

All the above-described laws are derived from the blackbody having an emissivity of 1.00. In practice, however, most objects are not ideal radiators, and hence have emissivities smaller than 1.00. For this reason, the value obtained by equation (2) must be corrected by multiplying a proper emissivity. Radiation energy of most objects other than the blackbody can be represented by equation (3):

$$W_2 = \epsilon \int_0^\infty W(\lambda,T)d = \epsilon\sigma T^4 \quad (3)$$

$\epsilon$: emissivity of object

Equation (3) represents infrared energy which is radiated from an object and incident on an infrared sensor. However, the infrared sensor itself emits infrared radiation in accordance with the same law described above. Therefore, if the temperature of the infrared sensor itself is $T_0$, its infrared radiation energy can be given as $\sigma T_0^4$, and energy W obtained by subtracting radiation energy from incident energy is given by equation (4):

$$W = \sigma(\epsilon T^4 + \gamma T_a^4 - T_0^4) \quad (4)$$

$T_a$: ambient temperature of object
$\gamma$: reflectance of object

Since the transmittance of the object to be measured can be regarded as zero, $\gamma = 1 - \epsilon$ can be established.

In equation (4), the infrared sensor is considered to be ideal and hence has an emissivity of 1.00.

In addition, assuming that the infrared sensor is left in an atmosphere of an ambient temperature $T_a$ so that the infrared sensor temperature $T_0$ is equal to the ambient temperature $T_a$, equations (4) can be rewritten as equation (5):

$$\begin{aligned} W &= \sigma(\epsilon T^4 + \gamma T_0^4 - T_0^4) \\ &= \epsilon\sigma(T^4 - T_0^4) \end{aligned} \quad (5)$$

FIG. 2 shows a basic arrangement of a conventional radiation thermometer. The arrangement will be described below with reference to FIG. 2.

A radiation thermometer comprises an optical system 2, a detecting section 3, an amplifying section 4, an operating section 5, and a display unit 6.

The optical system 2 is constituted by a focusing means 2a for efficiently focusing infrared radiation from an object L to be measured, and a filter 2b having transmission wavelength characteristics. A cylindrical member having an inner surface plated with gold is used as the focusing means 2a. A silicon filter is used as the filter 2b.

The detecting section 3 is constituted by an infrared sensor 3a and a temperature-sensitive sensor 3b. The infrared sensor 3a converts infrared radiation energy obtained by subtacting its own radiation energy from incident infrared radiation energy focused by the optical system 2 into an electrical signal, i.e., an infrared voltage $v_s$. In addition, the temperature-sensitive sensor 3b is arranged near the infrared sensor 3a to measure the temperature of the infrared sensor 3a and its ambient temperature $T_0$, and outputs a temperature-sensitive voltage $v_t$. A thermopile and a diode are respectively used as the infrared sensor 3a and the temperature-sensitive sensor 3b.

The amplifying section 4 comprises an infrared amplifier 4a, constituted by an amplifying circuit and an A/D converter for converting an output voltage from the amplifying circuit into digital infrared data $V_d$, for amplifying the infrared voltage $v_s$ output from the thermopile, and a temperature-sensitive amplifier 4b, constituted by an amplifying circuit and an A/D converter for converting an output voltage from the amplifying circuit into digital temperature-sensitive data, for amplifying the temperature-sensitive voltage $v_t$ as a forward-biased voltage from the temperature-sensitive sensor 3b, i.e., the diode.

Two signals $V_d$ and $T_0$ from the amplifying section 4 are then converted into temperature data T, and are displayed on the display unit 6. The operating section 5 comprises an emissivity input means 5a for setting an emissivity $\epsilon$ of the object L, and an operating circuit 5c for performing an operation based on equation (5).

With the above-described arrangement, temperature measurement of the object L can be performed by a noncontact scheme. An operation of this temperature measurement will be described below.

The object L emits infrared radiation, and its wavelength spectrum distribution covers a wide wavelength range, as shown in FIG. 3. The infrared radiation is focused by the focusing means 2a, transmitted through the filter 2b having the transmission wavelength characteristics, and reaches the infrared sensor 3a.

Other infrared radiation energies reach the infrared sensor 3a. One is infrared radiation energy emitted from a certain object near the object L, which is reflected by the object L and is then transmitted through the filter 2b and reaches the infrared radiation energy. Another is infrared radiation energy emitted from the infrared sensor 3a or a certain object near the sensor 3a, which is reflected by the filter 2b and reaches the sensor 3a. Still another is infrared radiation energy which is emitted from the filter 2b and reaches the sensor 3a.

The infrared radiation energy from the infrared sensor 3a can be represented by equation (3). In this case, $\epsilon = 1.00$. That is, to measure the temperature of the infrared sensor 3a itself is to indirectly measure the infrared radiation energy from the infrared sensor 3a. For this purpose, the temperature-sensitive sensor 3b is arranged near the infrared sensor 3a and measures the temperature of the infrared sensor 3a and the ambient temperature $T_0$. The infrared sensor 3a converts the infrared radiation energy W obtained by subtracting infrared radiation energy emitted therefrom from infrared radiation energy incident thereon into an electrical signal. Since the infrared sensor 3a employs a thermopile, it outputs the infrared voltage $v_s$ proportional to the infrared radiation energy W.

In this case, the infrared voltage $v_s$ as an output voltage from the infrared sensor 3a corresponds to a value obtained by multiplying the product of the infrared radiation energy W per unit area and a light-receiving area S of the infrared sensor 3a by a sensitivity R. The infrared data $V_d$ as an output voltage from the infrared amplifier 4a corresponds to a value obtained by multiplying the infrared voltage $v_s$ from the infrared sensor 3a by a gain A of the infrared amplifier 4a.

$$V_s = R \cdot W \cdot S$$

$$V_d = A \cdot v_s$$

Since the above equations can be established, equation (5) can be expressed as equation (6) as follows:

$$V_d = \epsilon \cdot \sigma S R A (T^4 - T_0^4) \quad (6)$$

where:
$V_d$: output voltage from infrared amplifier 4a

S: light-receiving area of infrared sensor 3a
R: sensitivity of infrared sensor
A: gain of infrared amplifier 4a Generally, equation (6) is simplified by setting $K_1 = \sigma SRA$, and hence the temperature T of the object L is calculated according to equation (7).

$$V_d = \epsilon K_1(T^4 - T_0^4)$$

$$T = \sqrt[4]{V_d/\epsilon K_1 + T_0^4} \quad (7)$$

A thermal infrared sensor used for a conventional radiation thermometer has no wavelength dependency. However, a transmission member such as a silicon or quarts filter is arranged as a window member on the front surface of a can/package in which the infrared sensor is mounted due to the following reason. Since infrared radiation from an object has the wavelength spectrum distribution shown in FIG. 3, such a filter is used to transmit only infrared radiation having a main wavelength band therethrough so as to reduce the influences of external light. Each of the above-described transmission members has unique transmission wavelength characteristics. A proper transmission member is selected on the basis of the temperature of an object to be measured, workability and cost of a transmission member, and the like.

FIG. 4 shows the transmittance of a silicon filter as one of the transmission members. The silicon filter shown in FIG. 4 transmits only infrared radiation having a wavelength band from about 1 to 18 [μm] therethrough, and has a transmittance of about 54%.

As described above, an infrared sensor with a filter has wavelength dependency, i.e., transmits infrared radiation having a specific wavelength band because of the filter as a window member although the sensor itself is a temperature sensor and has no wavelength dependency.

Therefore, equation (5) obtained by integrating infrared radiation energy incident on the infrared sensor with a filter with respect to all the wavelengths cannot be applied to the infrared sensor with a filter for transmitting infrared radiation having a specific wavelength band, and an error is included accordingly.

Furthermore, in the conventional arrangement, the sensitivity R of the infrared sensor is used as a constant. In practice, however, the sensitivity R of the infrared sensor varies depending on the infrared sensor temperature $T_0$. FIG. 5 shows this state. In FIG. 5, the sensitivity R is obtained by actually measuring the output voltage $v_s$ from a thermopile as an infrared sensor by using a blackbody, and the infrared sensor temperature $T_0$ is changed to plot changes in sensitivity R at the respective temperatures. As a result, it is found that the temperature dependency of the sensitivity R can be approximated to a straight line as represented by equation (8):

$$R = \alpha\{1 + \beta(T_0 - T_m)\} \quad (8)$$

where $\alpha$ is the sensitivity R as a reference when $T_0 = T_m$, $T_m$ is a representative infrared sensor temperature, e.g., an infrared sensor temperature measured in a factory, and $\beta$ represents a coefficient of variation. In this case, a coefficient of variability per 1 [deg] is −0.3 [%/deg].

The variation in sensitivity R described above inevitably becomes an error.

The coefficient of variation $\beta$ is influenced by the manufacturing conditions of a thermopile, and can be decreased by increasing the purity and process precision of the thermopile. However, thermopiles on the market which are mass-produced have the above value.

A radiation thermometer, however, is normally designed to measure high temperatures, and has a measurement range from about 0° to 300° C. and measurement precision of about ±2° to 3° C. Therefore, errors due to the above-described filter characteristics, variations in sensitivity of an infrared sensor, and the like are neglected, and hence no countermeasure has been taken so far. When measurement conditions as a clinical thermometer are taken into consideration, however, a temperature measurement range may be set to be as small as about 33° C. to 43° C., but ±0.1° C. is required for temperature measurement precision. Therefore, if the above-described radiation thermometer is used as a clinical thermometer, temperature measurement precision must be increased by taking countermeasures against errors due to the filter characteristics and the variations in sensitivity of infrared radiation.

A radiation clinical thermometer disclosed in U.S. Pat. No. 4,602,642 employs the following system as a countermeasure.

This radiation clinical thermometer comprises three units, i.e., a probe unit having an infrared sensor, a chopper unit having a target, and a charging unit. In addition, a heating control means for preheating the infrared sensor and the target to a reference temperature (36.5° C.) of the external ear canal is provided, and is driven by charged energy from the charging unit. When a body temperature is to be measured, the probe unit is set in the chopper unit, and the probe unit having the infrared sensor and the target are preheated by the heating control means. In this state, calibration is performed. Thereafter, the probe unit is detached from the chopper unit and is inserted in an external ear canal to detect infrared radiation from a drum membrane. A body temperature measurement is performed by comparing the detected infrared radiation with that from the target.

Temperature measurement precision is increased by the above-described system for the reasons to be described below.

According to this system, various error factors are eliminated by preheating the probe unit having the infrared sensor and the target to a reference temperature (36.5° C.) close to a normal body temperature by using the heating control means. That is, by heating the probe to the reference temperature higher than a room temperature and keeping the infrared sensor at a constant temperature regardless of ambient temperatures, sensitivity variations of the infrared sensor can be eliminated, and hence its error can be neglected. In addition, calibration is performed so as to set the reference temperature of the target to be close to a body temperature to be measured, and a comparative measurement is then performed so that errors and the like due to the filter characteristics are reduced to a negligible level. Furthermore, since the probe is preheated to a temperature close to a body temperature, the problem of the conventional measurement system can be solved, i.e., the problem that when a cool probe is inserted in an external ear canal, the temperatures of the external ear canal and the drum membrane are lowered because of the probe, so that correct body temperature measurement cannot be performed.

The above-described radiation clinical thermometer disclosed in U.S. Pat. No. 4,602,642 is excellent in temperature measurement precision. However, since this thermometer requires a heating control unit with high control precision, its structure and circuit arrangement become complicated, thereby increasing the cost. In addition, it requires a long stable period to preheat the probe and the target and control their temperatures to a predetermined temperature. Moreover, since the heating control unit is driven by a relatively large-power energy, a large charging unit having a power source cord is required. Therefore, the above-described system cannot be applied to a portable clinical thermometer using a small battery as an energy source.

SUMMARY OF THE INVENTION

It is an object of the present invention to provide a portable, compact radiation clinical thermometer at low cost while high temperature measurement precision is maintained by solving the above-described problems.

According to an aspect of the present invention, a filter correcting means outputs a correction value based on the transmission wavelength characteristics of a filter so that a body temperature is calculated on the basis of infrared data, temperature-sensitive data, and the filter correction value.

According to another aspect of the present invention, a body temperature is calculated on the basis of infrared data, temperature-sensitive data, a filter correction value, sensitivity data input from a sensitivity data input means.

DETAILED DESCRIPTION OF THE PREFERRED EMBODIMENTS

The present invention will be described below with reference to the accompanying drawings.

Figure 6:
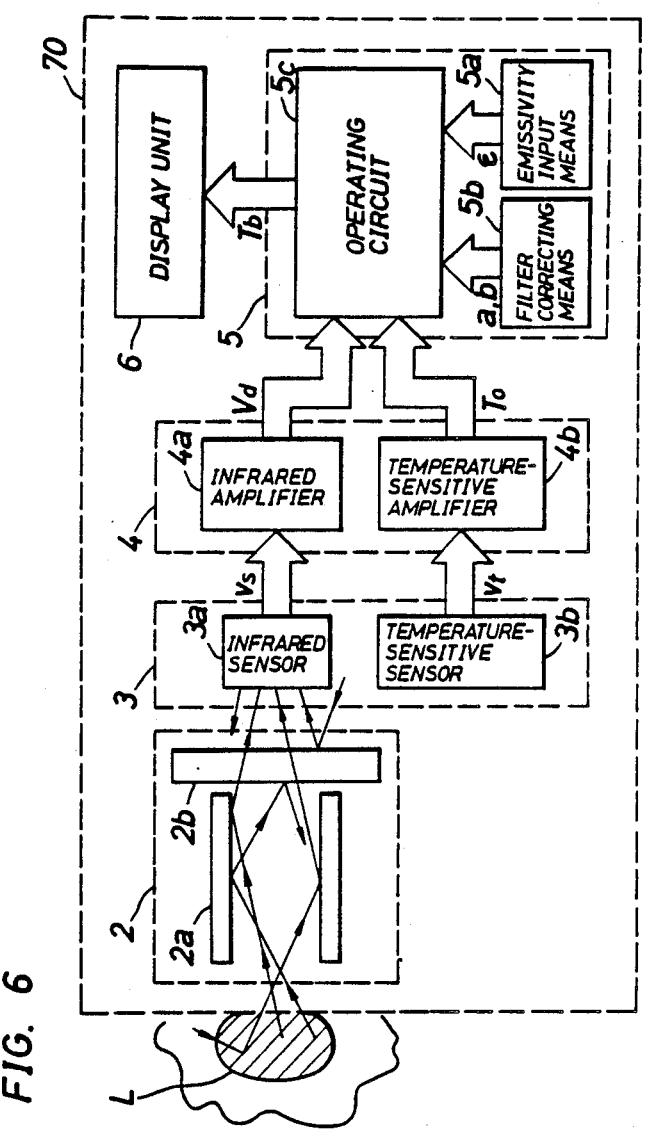
FIG. 6 is block diagram showing a circuit arrangement of an electronic clinical thermometer according to an embodiment of the present invention.

FIG. 6 is a block diagram showing a basic circuit arrangement of a radiation clinical thermometer according to a first embodiment of the present invention.

In this embodiment, variations in sensitivity R are reduced to a negligible level by using a thermopile manufactured under good manufacturing conditions so as to correct filter characteristics.

Figure 2:
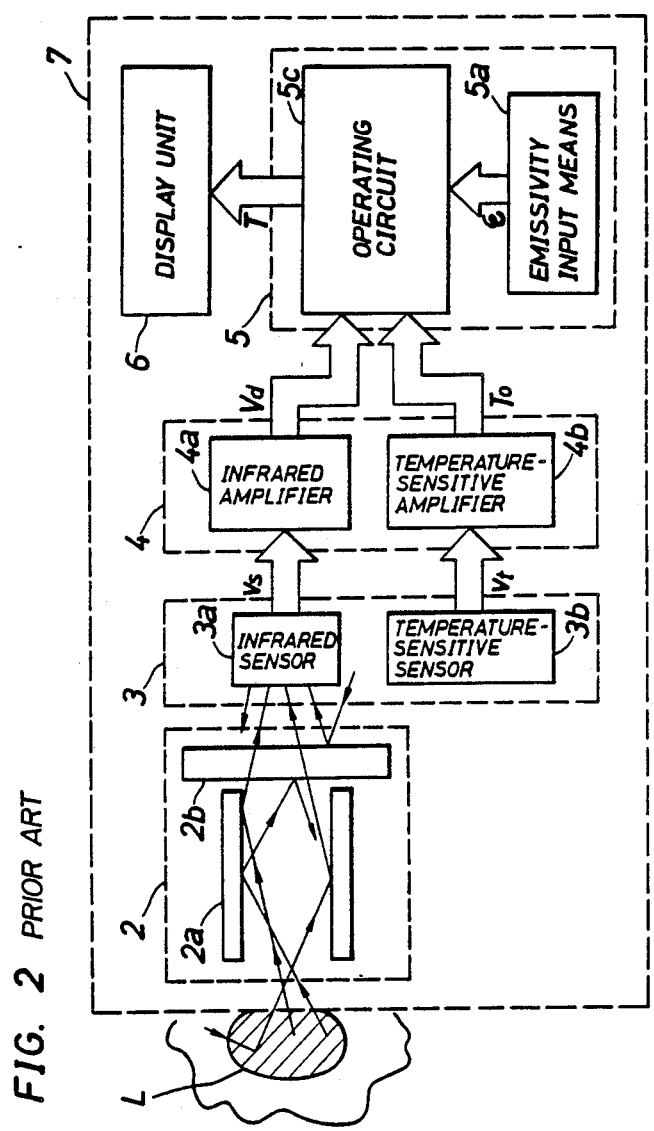
FIG. 2 is a block diagram showing a circuit arrangement of the conventional electronic thermometer.

The same reference numerals in FIG. 6 denote the same parts as in FIG. 2, and a description thereof will be omitted.

The radiation clinical thermometer of this embodiment differs from that shown in FIG. 2 in measurement of the temperature of the drum membrane of an ear as an object to be measured and the arrangement of an operation section 5.

The operation section 5 of a radiation clinical thermometer 70 comprises an emissivity input means 5a for setting an emissivity $\epsilon$ of an object L to be measured, a filter correcting means 5b for setting transmission wavelength characteristics of a filter 2b, and a body temperature operating circuit 5c.

The operating section 5 of this embodiment, therefore, calculates a measurement body temperature $T_b$ on the basis of an emissivity set value from the emissivity input means and a filter correction value from the filter correcting means 5b.

An equation for temperature calculation with consideration of the wavelength dependency of an infrared sensor with a filter will be described below.

As described above, the infrared sensor 3a converts the infrared radiation energy W obtained by subtracting radiation energy from incidence energy into the infrared voltage $v_s$. The energy W can be given by equation (9):

$$W = \int_0^\infty \epsilon \cdot \eta(\lambda) \cdot W(\lambda, T) d\lambda + \int_0^\infty (1 - \epsilon) \cdot \eta(\lambda) \cdot W(\lambda, T_0) d\lambda + \int_0^\infty (1 - \eta(\lambda)) \cdot W(\lambda, T_0) d\lambda - \int_0^\infty W(\lambda, T_0) d\lambda \quad (9)$$

where $\eta(\lambda)$ is the transmittance of the filter.

The first term of equation (9) represents infrared radiation energy emitted from the object L having the emissivity $\epsilon$ which is transmitted through the filter 2b and reaches the sensor 3a. The second term represents infrared radiation energy emitted from emitted from an object located near the object L and having the temperature $T_0$, which is transmitted through the filter 2b and reaches the sensor 3a. The third term represents infrared radiation energy emitted from the infrared sensor 3a having the temperature $T_0$ or an object located near the sensor 3a, which is reflected by the filter 2b and reaches the sensor 3a, or infrared radiation energy which is emitted from the filter 2b having the temperature $T_0$ and reaches the sensor 3a. In this case, the sum of the transmittance, reflectance, and emissivity of the transmission member is equal to one. The third term is established in consideration of the reflection or radiation by the filter 2b. Note that the infrared radiation from the infrared sensor 3a is reflected by the filter 2b. The fourth term represents infrared radiation energy from the infrared sensor 3a itself having the temperature $T_0$, and a sign of this term is negative.

Equation (9) can be rewritten to equation (10) as follows:

$$W = \epsilon \left[ \int_0^\infty \eta(\lambda) \cdot W(\lambda, T) d\lambda - \int_0^\infty \eta(\lambda) \cdot W(\lambda, T_0) d\lambda \right] \quad (10)$$

It is found, therefore, that the infrared radiation energy obtained by subtracting radiation energy from incident energy of the infrared sensor 3a having the filter 2b does not correspond to "a value proportional to the difference between a power of four of the absolute temperature and that of the temperature of the sensor itself" as represented by equation (5), but must be given by an equation based on the transmission wavelength characteristics of the filter 2b as represented by equation (10). That is, a new equation must be established in place of the Stefan-Boltzmann law represented by equation (2).

If infrared radiation energy emitted from the blackbody having the absolute temperature T, which is transmitted through a filter having a transmittance $\eta(\lambda)$ is set to be F(T), F(T) can be represented by equation (11) as follows:

$$F(T) = \int_0^\infty \eta(\lambda) \cdot W(\lambda, T) d\lambda \quad (11)$$

In this case, assuming that the absolute temperature T has a temperature range from $T_{min}$ to $T_{max}$, the infrared radiation energy F(T) is calculated with respect arbitrary absolute temperatures $T_1, T_2, T_3, \ldots, T_n$ according to equation (11). The calculation results are summarized in Table 1.

TABLE 1

| T | F(T) |
|---|------|
| $T_1$ | $F(T_1)$ |
| $T_2$ | $F(T_2)$ |
| $T_3$ | $F(T_3)$ |
| . | . |
| . | . |
| . | . |
| $T_n$ | $F(T_n)$ |

Figure 7:
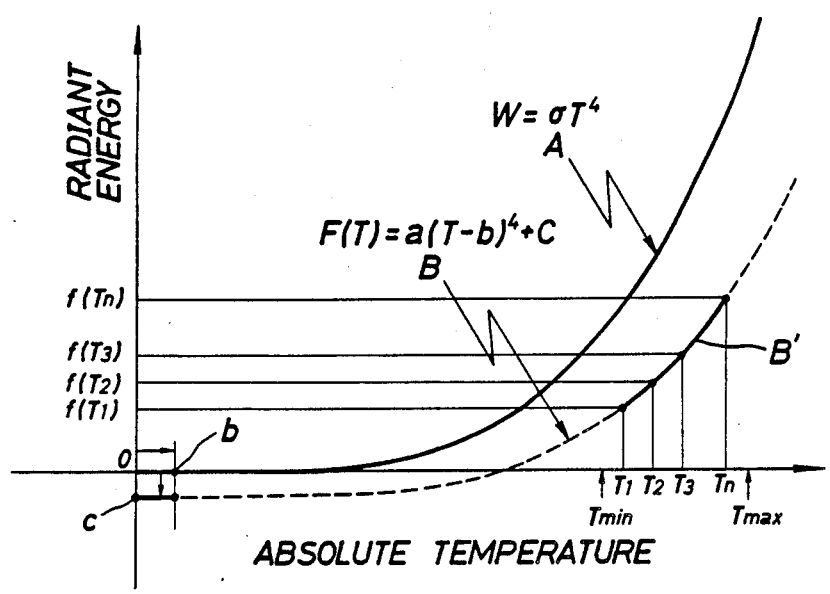
FIG. 7 is a graph of temperature characteristics for explaining an approximate expression of temperature measurement by the conventional electronic thermometer.

It is, therefore, seen how the relationship between the absolute temperature T and the infrared radiation energy F(T) transmitted through the filter is associated with the Stefan-Boltzmann law. FIG. 7 is a graph for explaining the examination process. The process will be described below with reference to FIG. 7.

In this graph, absolute temperatures [K] are plotted along the axis of abscissa and radiation energies [W/cm$^2$] are plotted along the axis of ordinate. Referring to FIG. 7, a curve A is a characteristic curve based on equation (2) representing the Stefan-Boltzmann law, and a curve B is a characteristic curve based on the present invention considering the filter characteristics.

The curve B is obtained such that a curve B' is prepared by connecting points respectively representing radiation energies at the absolute temperatures $T_1$ to $T_n$ shown in Table 1, and the curve A is modified and moved to overlap the curve B'. Types of modification and movement of the curve A' are determined by selecting a coefficient a of a term of degree 4 of the curve A, a displacement b in the direction of the abscissa axis, and a displacement c in the direction of the ordinate axis so as to overlap the curve A and the curve B'.

As a result, equation (11) is approximated to equation (12) by using the three types of set values a, b, and c.

$$F(T) = a \cdot (T-b)^4 + c \quad (12)$$

Subsequently, proper values a, b, and c in equation (12) are obtained from the values shown in Table 1 by a method of least squares or the like. Substitutions of these values into equation (12) yield an approximate equation.

The set values a, b, and c will be described below in comparison with equation (2) representing the Stefan-Boltzmann law.

The set value a is a coefficient of the absolute temperature T of degree 4, and corresponds to the Stefan Boltzmann constant $\sigma$ of the curve A. The value a takes a unit value of [W/cm$^2$ deg$^4$]. The set value b represents a symmetrical axis temperature. In the curve A, an absolute temperature 0 [K] is set to a symmetrical axis, whereas in the curve B, an absolute temperature b [K] is set to be a symmetrical axis.

The set value c represents a minimum value. In the curve A, 0 [W/cm$^2$] is set to be an offset, whereas in the curve B, c [W/cm$^2$] is set to be an offset.

If equation (10) is rewritten by using equation (12), equation (13) is established as follows:

$$W = \epsilon[a \cdot (T - b)^4 + c] - \quad (13)$$
$$\epsilon[a (T_0 - b)^4 + c]$$
$$= \epsilon \cdot a[(T - b)^4 - (T_0 - b)^4]$$

As is apparent from equation (13), the minimum value c is canceled.

In this case, the infrared data $V_d$ based on infrared radiation emitted from the drum membrane is obtained from the light-receiving area S and the sensitivity R of the infrared sensor $3a$ and the gain A of the infrared amplifier $4a$ by setting $K_2=aSRA$. Equation (13) is then rewritten as equation (14). The body temperature $T_b$ through the drum membrane is calculated by using equation (15) on the basis of equation (14).

$$V_d = \epsilon K_2[(T_b - b)^4 - (T_0 - b)^4] \quad (14)$$

$$T_b = \sqrt[4]{V_d/\epsilon K_2 + (T_0 - b)^4} + b \quad (15)$$

That is, when a filter having transmission wavelength characteristics is used for an optical system member, a temperature calculation is not performed on the basis of the law "infrared radiation energy is proportional to a power of four of the absolute temperature T", but must be based on equation (14) representing the law "infrared radiation energy is proportional to a power of four of (the absolute temperature T—the symmetrical axis temperature b)."

As a result, the filter correcting means $5b$ shown in FIG. 6 outputs the symmetrical axis temperature b, and the operating circuit $5c$ calculates the body temperature $T_b$ of the object L to be measured, i.e., the drum membrane on the basis of equation (15).

An approximate expression in consideration of a silicon filter used as the filter $2b$ in practice will be described below.

Figure 4:
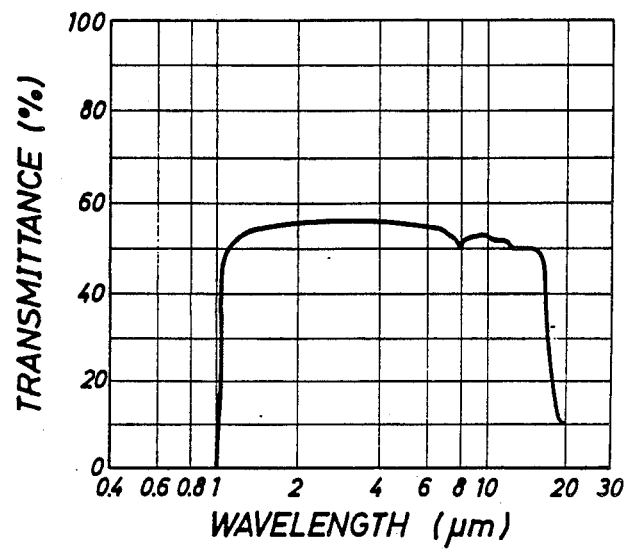
FIG. 4 is a graph showing the transmission wavelength characteristics of a silicon filter.

FIG. 4 shows the transmission wavelength characteristics of the silicon filter. However, in order to simplify a calculation, the transmission wavelength band of the silicon filter is set to be 1 to 18 [μm], and its transmittance is set to be 54%.

$$f(T) = \int_0^\infty \eta(\lambda) \cdot W(\lambda,T)d\lambda \quad (16)$$
$$= \int_{1 \times 10^{-4}}^{18 \times 10^{-4}} 0.54 \cdot W(\lambda,T)d\lambda$$

Equation (1) is substituted into $W(\lambda,T)$.

Since a measurement environment, i.e., the measurement temperature range of the object to be measured is set between 0 [°C.] and 50 [°C.], $T_{min}$ and $T_{max}$ are respectively set to be 273 [K] and 323 [K]. Table 2 shows the calculation results of equation (16).

The values a, b, and c when equation (12) is approximated by using the data shown in Table 2 are obtained by a method of least squares:
a=4.101×10⁻¹²[W/cm²·deg⁴]
b=45.96[K]
c=−6.144×10⁴[W/cm²]

The coefficient a of a term of degree 4 and the symmetrical axis b thus obtained represent the transmission wavelength characteristics of the silicon filter. These values a and b are output from the filter correcting means $5b$. The filter correcting means $5b$ is part of an operating program memory of the operating section 5, in which coefficient a of the term of degree 4 and the symmetrical axis temperature b are written.

TABLE 2

| T [K] | f(T) × 10⁻³ [W/cm²] | T [K] | f(T) × 10⁻³ [W/cm²] |
|---|---|---|---|
| 273 | 10.290 | 299 | 16.208 |
| 275 | 10.679 | 301 | 16.746 |
| 277 | 11.078 | 303 | 17.298 |
| 279 | 11.487 | 305 | 17.862 |
| 281 | 11.908 | 307 | 18.439 |
| 283 | 12.339 | 309 | 19.030 |
| 285 | 12.782 | 311 | 19.634 |
| 287 | 13.236 | 313 | 20.252 |
| 289 | 13.701 | 315 | 20.884 |
| 291 | 14.178 | 317 | 21.530 |
| 293 | 14.667 | 319 | 22.191 |
| 295 | 15.169 | 321 | 22.865 |
| 297 | 15.682 | 323 | 23.555 |

When a silicon filter is used as a window member for measurement of an infrared sensor, the temperature T of an object to be measured is not calculated by equation (5), but is calculated by equation (14), thereby performing temperature calculations with high precision.

As is apparent from the above description, according to this embodiment, even if a transmission member having transmission wavelength characteristics is used as a window member of an infrared sensor, temperature measurement of an object to be measured can be performed with high precision.

In addition, even if the material of the transmission member as a window member of the infrared sensor is changed, temperature measurement can be performed with high precision by updating the value of the filter correcting means $5b$ as part of the program memory.

Figure 13:
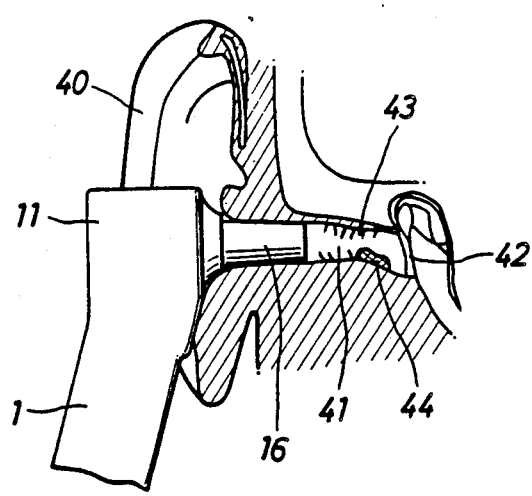
FIG. 13 is a view showing a state wherein the temperature measuring section of the electronic clinical thermometer is inserted in an external ear canal.

In the above embodiment, an approximate expression having a term of degree 4 as represented by equation (12) is used as a new equation replacing the Stefan-Boltzmann law. However, as shown in FIG. 13, in body temperature measurement, only a portion of the temperature measurement curve is used as a measurement range such as the range from $T_{min}$ to $T_{max}$. Therefore, an approximate expression having a term of degree 4 need not be used. Satisfactory precision of a clinical thermometer can be obtained by using an approximate expression with a proper degree. For example, expression (14) can be employed as an approximate equation having a term of degree 2:

$$V_d=\epsilon K_2'\{(T_b-b')^2-(T_0-b')^2\} \quad (14')$$

A detailed arrangement of a radiation clinical thermometer which is actually manufactured by using a commercially available thermopile manufactured in consideration of mass production will be described below as a second embodiment of the present invention.

Figure 8:
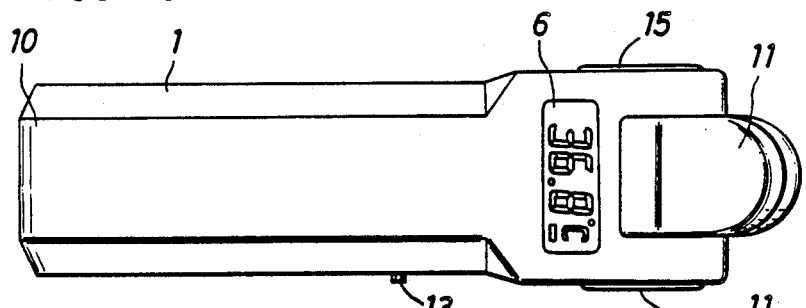
FIG. 8 is a plan view of an electronic thermometer of the present invention.
Figure 9:
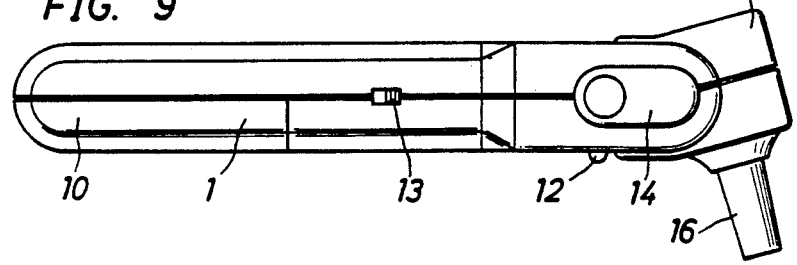
FIG. 9 is a side view of the electronic thermometer in FIG. 8.

FIGS. 8 and 9 are bottom and side views, respectively, showing a radiation clinical thermometer according to the second embodiment of the present invention. Reference numberal 1 denotes a radiation clinical thermometer comprising a main body portion 10 and a head portion 11. The display unit 6 for displaying a body temperature is arranged on the lower surface of the main body portion 10. A check button 12 having a push button structure is formed on the upper surface of the portion 11. A power switch 13 having a slide structure and major buttons 14 and 15 each having a push button structure are respectively formed on the side surfaces of the portion 11.

The head portion 11 extend from the end of the main body portion 10 in the form of an L shape. The end of the head portion 11 constitutes a probe 16. The probe 16 comprises an optical system 2 and a detecting section 3 shown in FIG. 6.

The radiation clinical thermometer 1 is operated as follows. A check operation (to be described later) is performed while the power switch is ON. Thereafter, while the probe 16 is inserted in an external ear canal of a patient to be examined, either or both of the major switches 14 and 15 is/are depressed, thereby instantaneously completing body temperature measurement. The measurement result is displayed on the display unit 6 as a body temperature.

Figure 10:
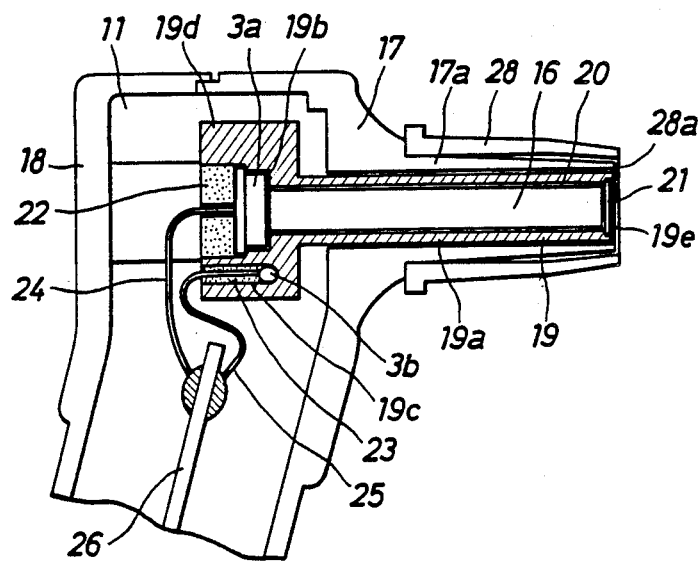
FIG. 10 is a sectional view showing an internal structure of a temperature measuring section of the electronic clinical thermometer in FIG. 8.

FIG. 10 is a sectional view of the head portion 11. Each of case members 17 and 18 consists of a resin molded member having a very low thermal conductivity. A portion of the case 17 covering the probe 16 constitutes a cylindrical member 17a, in which a metal housing 19 consisting of a lightweight metal having a high thermal conductivity such as aluminum is fitted. The metal housing 19 comprises a cylindrical portion 19a and a base portion 19d having a hollow portion 19b communicating with the cylindrical portion 19a and a recess 19c in which a temperature-sensitive element is embedded. In addition, a step portion 19e for attachment of a filter is formed at the distal end of the cylindrical portion 19a. An optical guide 20 consisting of a brass (Bu) pipe having an inner surface plated with gold (Au) is fitted in the cylindrical portion 19a. A filter member in the form of a dust-proof hard cap 21 selectively allowing infrared radiation to pass therethrough is fixed to the step portion 19e. In addition, a thermopile as the infrared sensor 3a and the temperature-sensitive sensor 3b are respectively embedded in the hollow portion 19b and the recess 19c of the base portion 19d by sealing resins 22 and 23. The infrared sensor 3a and the temperature-sensitive sensor 3b are respectively connected to wiring patterns of a circuit board 26 through leads 24 and 25, and are led to amplifying circuits to be described later.

According to the above-described arrangement, since the infrared sensor 3a, the optical guide 20, and the hard cap 21 are connected to each other through the metal housing 19 having a high thermal conductivity, they can always be kept in a thermal equilibrium state. This uniform temperature is detected by the temperature-sensitive sensor 3b. Reference numeral 28 denotes a temperature measurement cover which is detachably fitted on the probe 16 and is constituted by a resin having a low thermal conductivity. A distal end portion 28a of the cover 28 consists of a material through which infrared radiation can be transmitted.

Figure 11:
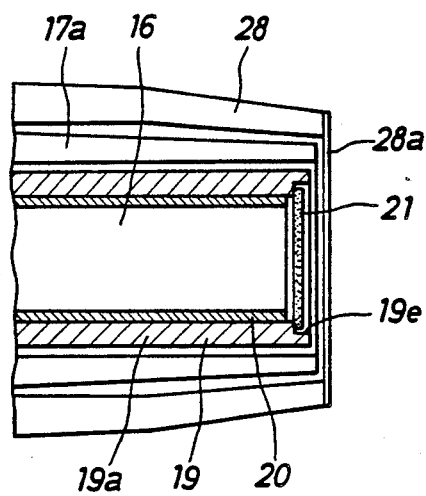
FIG. 11 is an enlarged sectional view showing part of the temperature measuring section of the electronic clinical thermometer.

FIG. 11 is an enlarged sectional view of the distal end portion of the probe 16. The distal end portion 28a of the cover 28 covers the distal end portion of the probe 16 so as to prevent contact of the probe 16 with the inner wall of the external ear canal.

Figure 12:
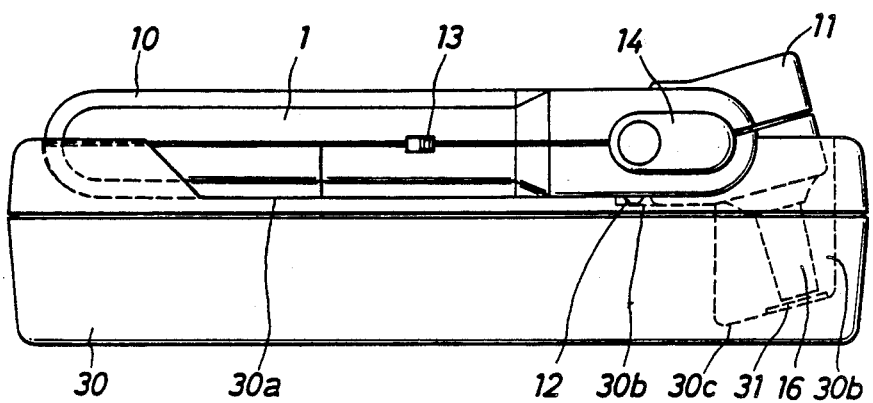
FIG. 12 a side view showing a state wherein the electronic clinical thermometer is stored in a storage case.

FIG. 12 is a side view showing a state wherein the radiation clinical thermometer 1 is stored in a storage case 30. The storage case 30 comprises a mounting portion 30a for mounting the main body portion 10, and a storage portion 30b for storing the probe 16. A reflecting plate 31 is fixed to a bottom surface 30c of the storage portion 30b at a position corresponding to the distal end portion of the probe 16. In addition, a button depressing portion 30d is formed on the storage case 30 at a position corresponding the check button 12. The storage case 30 is used to perform an operation check of the radiation clinical thermometer 1. When the thermometer 1 is set in the storage case 30 with the power switch 13 being turned on as shown in FIG. 12, the distal end portion of the probe 16 is set on the reflecting plate 31, and at the same time, the check button 12 is depressed by the button depressing portion 30d. This state is a function check state to be described later. In this state, a user can know from a display state of the display unit 6 whether body temperature measurement can be performed.

FIG. 13 is a sectional view of an ear, showing a state wherein a body temperature measurement is performed by the radiation clinical thermometer 1. Reference numeral 40 denotes a canal; 41, external ear canal; and 42, a drum membrane. A large number of downy hairs are grown from the inner wall of the external ear canal 41. Earwax is sometimes formed on the inner wall of the external ear canal 41. When the distal end portion of the probe 16 of the radiation clinical thermometer 1 is inserted in the external ear canal 41, and the major buttons 14 and 15 are depressed with the distal end portion directed to the drum membrane 42 as shown in FIG. 13, a body temperature measurement can be instantaneously performed.

Figure 14:
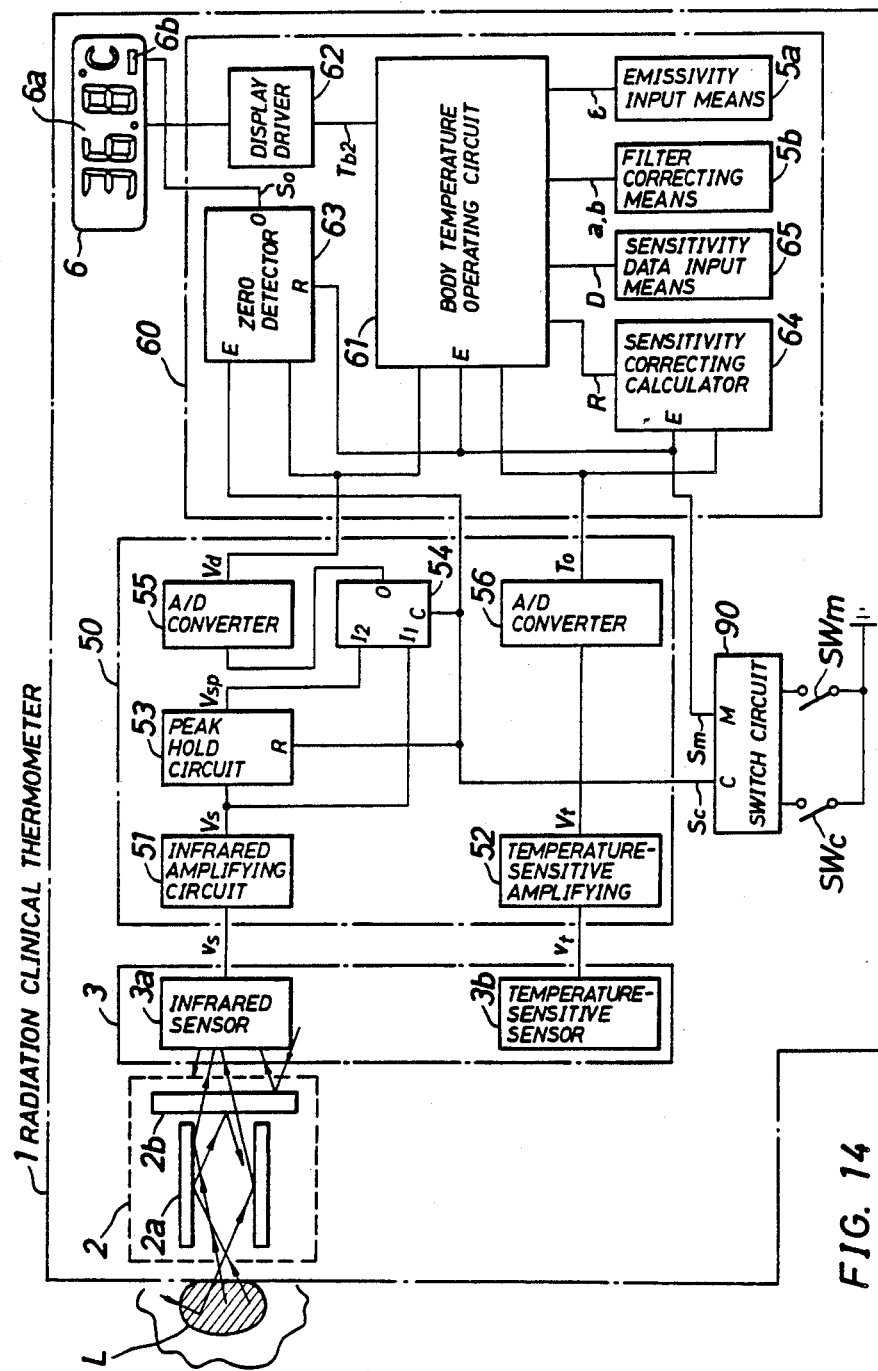
FIG. 14 is a block diagram showing a circuit arrangement of an electronic clinical thermometer according to a second embodiment of the present invention.

FIG. 14 is a block diagram of the radiation clinical thermometer 1 in FIG. 8. The same reference numerals in FIG. 14 denote the same parts as in FIG. 6, and a description thereof will be omitted.

Portions different from FIG. 6 will be described below. Reference numeral 50 denotes a detection signal processing section. FIG. 14 show a detailed arrangement of the section 50 corresponding to the amplifying section 4 shown in FIG. 6. More specifically, the section 50 comprises an infrared amplifying circuit 51 for amplifying an infrared voltage $v_s$ output from the infrared sensor 3a, a temperature-sensitive amplifying circuit 52 for amplifying a temperature-sensitive voltage $v_t$ output from the temperature-sensitive sensor 3b, a peak hold circuit 53 for holding a peak value of an output voltage $V_s$ from the infrared amplifying circuit 51, a switching circuit 54 for receiving the output voltage $V_s$ from the infrared amplifying circuit 51 and an output voltage $V_{sp}$ from the peak hold circuit 53 at input terminals $I_1$ and $I_2$, respectively, and selectively outputting them from an output terminal O in accordance with conditions provided from a control terminal C, an A/D converter 55 for converting the infrared voltages $V_s$ or $V_{sp}$ output from the switching circuit 54 into digital infrared data $V_d$, and an A/D converter 55 for converting the output voltage $V_t$ from the temperature-sensitive amplifying circuit 52 into digital temperature-sensitive data $T_0$. With this arrangement, the section 50 converts the infrared voltage $v_s$ and the temperature-sensitive voltage $v_t$ supplied from the detecting section 3 into the digital infrared data $V_d$ and temperature-sensitive data $T_0$, and outputs them.

Figure 5:
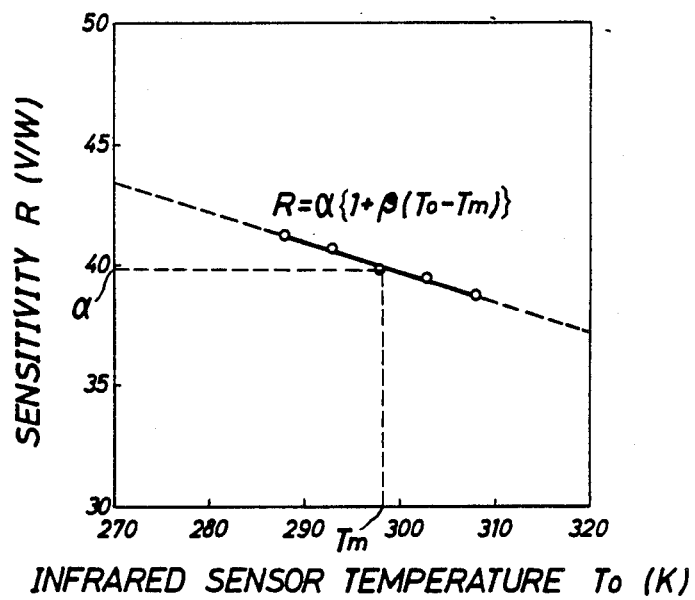
FIG. 5 is a graph showing the sensitivity characteristics of an infrared sensor.

An operating section 60 corresponds to the operating section 5 shown in FIG. 6, and comprises an emissivity input means 5a, a filter correcting means 5b, a body temperature operating circuit 61 corresponding to the operating circuit 5c, a display driver 62 for receiving a body temperature data $T_{b1}$ calculated by the operation circuit 61 and displaying it on a body temperature display portion 6a of a display unit 6, a zero detector 63 for receiving the infrared data $V_d$ output from the detection signal processing section 50 and outputting a detection signal $S_0$ when the infrared data $V_d$ is detected to be zero so as to illuminate a measurement permission mark 6b of the display unit 6, a sensitivity correcting calculator 64 for receiving the temperature-sensitive data $T_0$ output from the section 50, calculating a sensitivity R in accordance with equation (8) shown in FIG. 5, and outputting it, and a sensitivity data input means 65 for outputting as sensitivity data D a value which is externally input/set on the basis of the light-receiving area S of the infrared sensor 3a and the gain A of the infrared amplifying circuit 51 shown in equation (6).

Reference numeral 90 denotes a switch circuit to which a major switch $SW_m$ operated by the major switches 14 and 15 shown in FIG. 8 and a check switch $SW_c$ operated by the check button 12 are connected. When either of the major buttons 14 and 15 is depressed, the major switch $SW_m$ is turned on, and a major signal $S_m$ is output from a terminal M.

When the radiation clinical thermometer 1 is set in the storage case 30 as shown in FIG. 12, the check button 12 is depressed, and the check switch $SW_c$ is turned on. As a result, a check signal $S_c$ is output from a terminal C.

The major signal $S_m$ output from the terminal M of the switch circuit 90 is supplied to enable terminals E of the body temperature operating circuit 61 and the sensitivity correcting calculator 64. As a result, both the circuit 61 and the calculator 64 are set in an operative mode, and at the same time, the zero detector 63 is reset. The check signal $S_c$ output from the terminal C of the switch circuit 90 is supplied to an enable terminal E of the zero detector 63, the control terminal C of the switching circuit 54, and a reset terminal R of the peak hold circuit 53.

An operation of the radiation clinical thermometer 1 having the above-described arrangement will be described below.

In an initial state wherein the power switch 13 of the radiation clinical thermometer 1 shown in FIG. 8 is turned on, since both the check switch $SW_c$ and the major switch $SW_m$ are kept off, the check signal $S_c$ and the major signal $S_m$ are not output from the switch circuit 70.

Consequently, in the operation section 60, the body temperature operating circuit 61 and the sensitivity correcting calculator 64 are set in a non-calculation mode, and the zero detector 63 is set in an inoperative mode. In addition, the switching circuit 54 of the detection signal processing section 50 selectively outputs the voltage $V_{sp}$ input to the terminal $I_2$ to the output terminal O. The reset state of the peak hold circuit 53 is released and is set in an operative state.

The initial state is established in this manner. A function check mode will be described next.

When the thermometer 1 is set in the storage case 30 as shown in FIG. 12, the check button 12 is urged against the button depressing portion 30d of the storage case 50. As a result, the check switch $SW_c$ shown in FIG. 14 is turned on, and at the same time, the distal end portion of the probe 16 is set at the position of the reflecting plate 31.

Consequently, the switch circuit 90 outputs the check signal $S_c$ from terminal C when the check switch $SW_c$ is turned on, and supplies it to the peak hold circuit 53, the switching circuit 54, and the zero detector 63. Upon reception of the check signal $S_c$, in the detection signal processing section 50, the peak hold circuit 53 is reset, and at the same time, the switching circuit 54 is switched to a state wherein the voltage $V_s$ supplied to the input terminal $I_1$ is selectively output to the output terminal O. Subsequently, the A/D converter 55 converts the infrared voltage $V_s$ into a digital value and outputs it as the infrared data $V_d$. In the operation section 60, the body temperature operating circuit 61 and the sensitivity correcting calculator 64 are set in an inoperative mode, and only the zero detector 63 is set in an operative state. The state of each portion in the function check mode has been described so far. The radiation clinical thermometer 1 in this function check mode is operated as follows. The infrared data $V_d$ obtained by converting infrared radiation reflected by the reflecting plate 31 into a digital value by using the infrared sensor 3a, the infrared amplifying circuit 51, the switching circuit 54, and the A/D converter 55 is determined by the zero detector 63. If this infrared data $V_d$ is zero, the zero detector 63 outputs the detection signal $S_0$ from the output terminal O so as to illuminate the measurement permission mark 6b of the display unit 6.

The contents of the function check mode will be described below.

Referring to FIG. 10, as described above, since the infrared sensor 3a, the optical guide 20, and the hard cap 21 are connected to each other through the metal housing 19 having a high thermal conductivity, thermal equilibrium of these components can be obtained. The above-described function check mode is a mode for confirming that the thermal equilibrium is satisfactorily obtained. More specifically, infrared radiation energies emitted from the optical guide 20 and the hard cap 21 each having the temperature T are reflected by the reflecting plate 31, and are incident on the infrared sensor 3a. In addition, infrared radiation energy is emitted from the infrared sensor 3a having the temperature $T_0$. The energy W obtained by subtracting the emitted energy from the incident energy is given by equation (5) as described above:

$$W = \epsilon \sigma (T_4 - T_0^4)$$

If $T = T_0$, the energy W is not present. Hence, all the voltages $v_s$ and $V_s$, and the infrared data $V_d$ are set to zero, and the detection signal $S_0$ is output from the zero detector 63. That is, the measurement ready permission mark 6b is illuminated to confirm that the heat source causing noise is present near the optical system 2, and hence body temperature measurement can be performed. Note that the zero detector 63 determines the infrared data $V_d$ as a digital value. A determination value need not be strictly zero. The zero detector 63 outputs the detection signal $S_0$ if the infrared data $V_d$ is smaller than a predetermined determination value. In this case, even if the determined value is not zero, it is regraded as negligible. If $T \neq T_0$ according to equation 5, i.e., if there is a temperature difference among the infrared sensor 3a, the optical guide 20, and the hard cap 21, the differential energy W is present. Therefore, the infrared data $V_d$ becomes larger than the determination level of the zero detector 63. As a result, the detection signal $S_0$ is not output, and the measurement permission mark 6b is not illuminated.

In actual use of the radiation clinical thermometer 1, the state of $T \neq T_0$ occurs as follows.

When the environmental temperature in use of the radiation clinical thermometer 1 is abruptly changed, the above state occurs. In this case, $T \neq T_0$ occurs due to differences in heat capacity and response characteristics of the respective elements. Since a measurement error corresponding to the value of the infrared data $V_d$ based on the differential energy W occurs, the thermometer 1 is set in a measurement disable state. In this state, if the thermometer 1 is left in a constant environmental temperature for a while, the respective elements are stabilized in a thermal equilibrium state upon thermal conduction through the metal housing 19, and the thermometer 1 is set in a measurement permission state. However, it may takes several tens of minutes to established such a stable state.

The function check mode has been described so far. A body temperature measurement mode will be described next.

The radiation clinical thermometer 1 is detached from the storage case 30 after illumination of the measurement permission mark 6b is confirmed in the above-described function check mode. When the thermometer 1 is detached from the case 30, depression of the check button 12 is released, so that the check switch $SW_c$ is turned off, and output of the check signal $S_c$ from the terminal C of the switch circuit 90 is stopped. As a result, the reset state of the peak hold circuit 53 is released. At the same time, the switching circuit 54 is returned to the selection state for the input terminal $I_2$, and the zero detector 63 is returned to the inoperative state.

Consequently, in the detection signal processing circuit 50, the peak voltage $V_{sp}$ of the infrared voltage $V_s$ output from the infrared amplifying section 51, which is held by the peak hold circuit 53, is supplied to the A/D converter 55 through the switching circuit 54, thereby outputting the digital infrared data $V_d$ converted from the peak voltage $V_{sp}$.

Although the zero detector 63 of the operating section 60 is returned to the inoperative state, the measurement permission mark 6b of the display unit 6 is kept illuminated because the detection signal $S_0$ is held by a storage circuit arranged in the zero detector 63. Since the major signal $S_m$ is supplied to the reset terminal R, the detection signal $S_0$ of the zero detector 63 is maintained until the storage circuit is reset.

In this manner, the apparatus is prepared for measurement. When the major buttons 14 and 15 are depressed after the radiation clinical thermometer 1 is inserted in the external ear canal 41 in this state as shown in FIG. 13, a body temperature measurement is performed. More specifically, when the major buttons 14 and 15 are depressed, the major switch $SW_m$ shown in FIG. 14 is turned on, and the major signal $S_m$ is output from the terminal M of the switch circuit 90. As a result, in the operation section 60, the body temperature operating circuit 61 and the sensitivity correcting calculator 64 are set in an operative mode, and at the same time, the zero detector 63 is reset to turn off the measurement permission mark 66 of the display unit 6. Infrared radiation energy which is emitted from the drum membrane 42 and is incident on the the probe 16 (the optical system 2 and the detecting section 3 in FIG. 14) inserted in the external ear canal 41 is converted into the infrared voltage $v_s$ by the infrared sensor 3a, and is amplified to the voltage $V_s$ by the infrared amplifying circuit 51. Thereafter, the peak voltage $V_{sp}$ is held by the peak hold circuit 53. The peak voltage $V_{sp}$ is converted into the infrared data $V_d$ by the A/D converter 55, and is supplied to the operating section 60. In addition, the temperature-sensitive sensor 36 embedded in the metal housing 19 detects the temperature of the infrared sensor 3a and converts it into the temperature-sensitive voltage $v_t$. The voltage is converted into the temperature-sensitive data $T_0$ by the A/D converter 56, and is then supplied to the operation section 60.

When the infrared data $V_d$ and the temperature-sensitive data $T_0$ are supplied to the operation section 60, the sensitivity correcting calculator 64 calculates the sensitivity R by using the data $T_0$ on the basis of equation (8). Note that the coefficient of variation $\beta$ is set to be $-0.03$. The body temperature operating circuit 61 then receives the sensitivity R calculated by the calculator 64, the sensitivity data D from the sensitivity data input means, and the coefficient a of a term of degree 4 from the filter correcting means 5b, and calculates a sensitivity coefficient $K_3$ of this system as $K_3 = aRD$.

Upon reception of the calculated sensitivity coefficient $K_3$, the emissivity $\epsilon$ from the emissivity input means 5a, and the symmetrical axis temperature b from the filter correcting means 5b, the body temperature operating circuit 61 performs a calculation based on equation (17):

$$V_d = \epsilon K_3\{(T_{b1}-b)^4 - (T_0-b)^4\} \tag{17}$$

Equation (17) is further rewritten to equation (18) so as to calculate the body temperature data $T_{b1}$. Since the external ear canal has a uniform temperature, and the canal is regarded as a blackbody, the emissivity $\epsilon$ is set as $\epsilon = 1$.

$$T_{b1} = \sqrt[4]{V_d/K_3 + (T_0 - b)^4} + b \tag{18}$$

for $b = 45.95[K\pm]$. Thus, the body temperature data $T_{b1}$ is displayed on a digit display portion 6a of the display unit 6 through the display driver 62.

Figure 15:
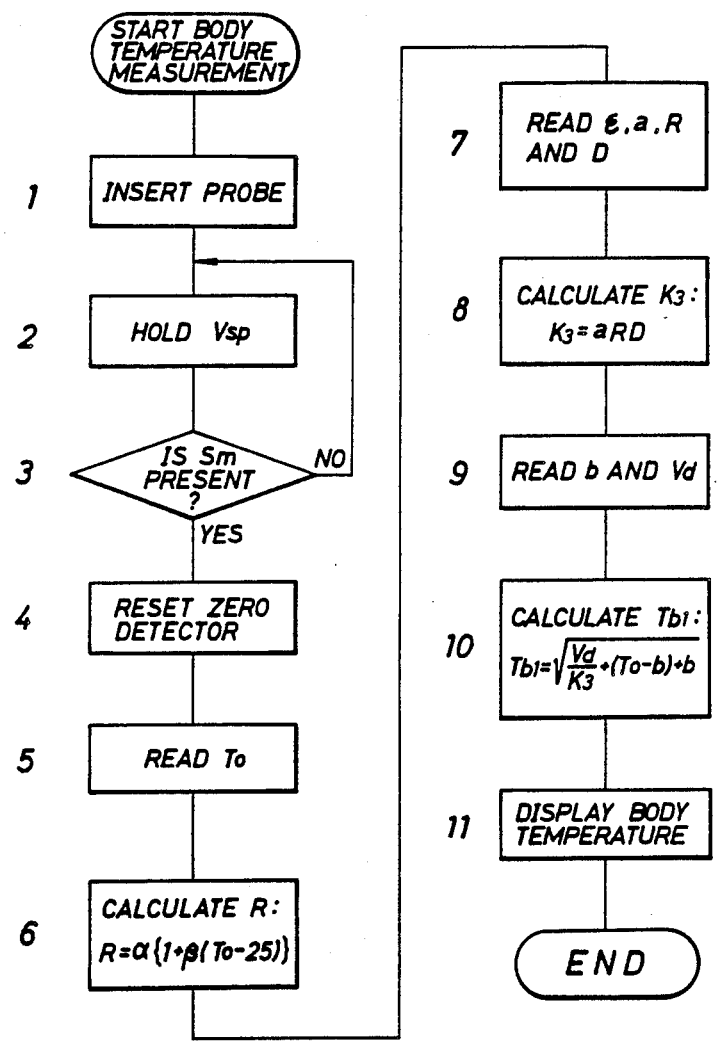
FIG. 15 is a flow chart for explaining a body temperature calculating operation in the embodiment shown in FIG. 14.

One body temperature measurement is performed in this manner. A procedure of this operation will be described with reference to the flow chart of FIG. 15.

When the probe 16 is inserted in the external ear canal 41 (step ①), infrared radiation energy from the drum membrane 42 is converted into the infrared voltage $V_s$, and its peak voltage $V_{sp}$ is held by the peak hold circuit 53 (step ②). The presence/absence of the major signal $S_m$ is then determined (step ③). If the major buttons 14 and 15 are not depressed, NO is obtained in this step, and only the peak value holding operation in step 2 is performed.

If the major buttons 14 and 15 are depressed, YES is obtained in step ③. As a result, the zero detector 63 is reset by the major signal $S_m$ (step ④). At the same time, the sensitivity correcting calculator 64 reads the temperature-sensitive data $T_0$ (step ⑤) and calculates the sensitivity R (step ⑥).

The body temperature operating circuit 61 reads the emissivity $\epsilon$, the coefficient a, the sensitivity R, and the sensitivity data D (step ⑦), and calculates the sensitivity coefficient $K_3$ by using the values a, R, and D (step ⑧). In addition, the operating circuit 61 reads the symmetrical axis temperature b and the peak-held infrared data $V_d$ (step ⑨) and calculates the body temperature data $T_{b1}$ (step ⑩). The display driver 62 receives the body temperature data $T_{b1}$ and displays the body temperature on the display unit 6 (step ⑪), thereby completing the body temperature measurement.

The function of the peak hold circuit 53 shown in FIG. 14 will be described below with reference to FIG. 16.

Figure 1:
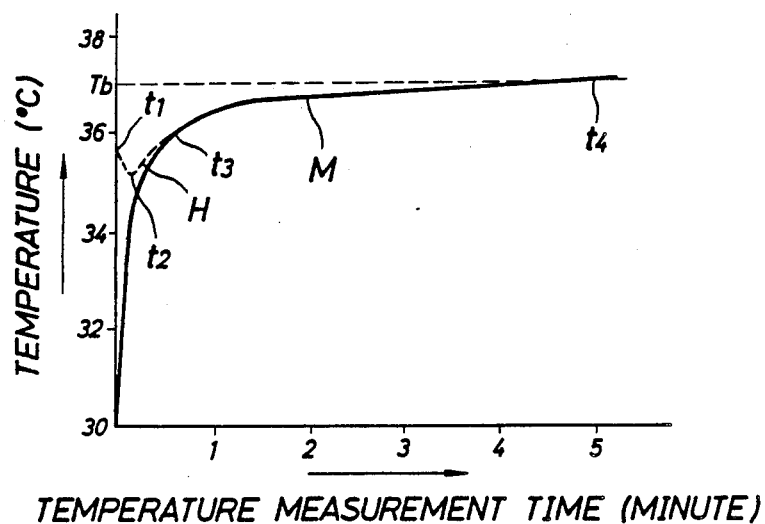
FIG. 1 is a graph showing temperature measurement curves of a conventional electronic clinical thermometer.
Figure 3:
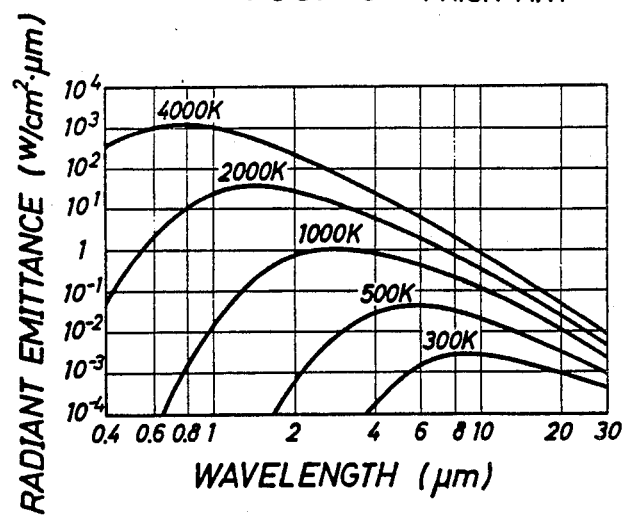
FIG. 3 is a graph showing changes in intensity of an infrared wavelength spectrum depending on the temperature of an object.
Figure 16:
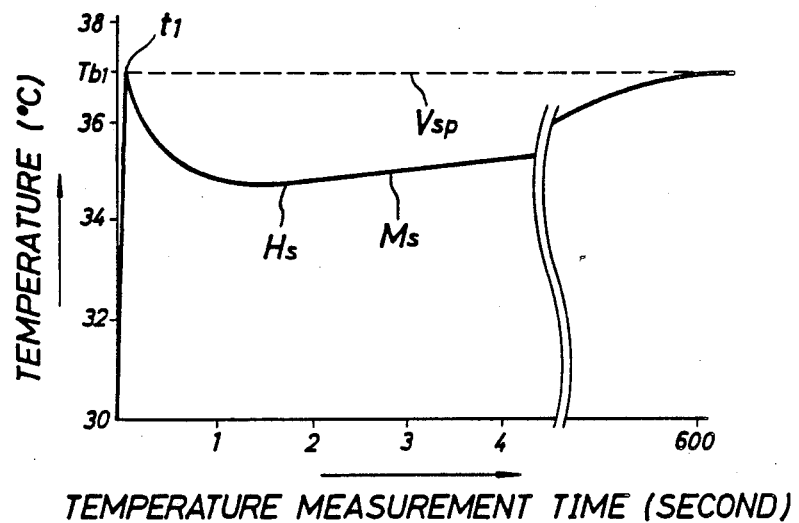
FIG. 16 is a graph showing a temperature measurement curve of the electronic clinical thermometer of the present invention.

FIG. 16 shows a temperature measurement curve of the radiation clinical thermometer 1 of the present invention, which corresponds to the temperature measurement curve of the conventional electronic clinical thermometer shown in FIG. 1.

Temperature measurement time is plotted along the abscissa axis, and measurement temperatures are plotted along the ordinate axis. The external ear canal 41 is a portion to be measured. A temperature curve $H_s$ of the external ear canal 41 coincides with a measurement temperature curve $M_s$ of the radiation clinical thermometer 1. As describe above, the downy hairs 43 and the earwax 44 are present in the external ear canal 41, as shown in FIG. 13. Similar to the drum membrane 42, the downy hairs 43 and the earwax 44 are warmed to a temperature very close to a body temperature prior to the start of temperature measurement. This state is indicated at time $t_1$ in FIG. 16. More specifically, time $t_1$ is the instant when the probe 16 is inserted in the external ear canal 41. Since the temperature in the external ear canal 41 at this instant is substantially equal to the body temperature $T_{b1}$, infrared radiation energy having a body temperature level is incident on the infrared sensor 3a, and is stored in the peak hold circuit 53 as the peak voltage $V_{sp}$. However, the temperature in the external ear canal 41 is cooled by the probe 16 and quickly drops immediately after the probe 16 is inserted, as indicated by the temperature curve $H_s$. With this temperature drop, the infrared voltage $V_s$ detected by the infrared sensor 3a drops to the level of the temperature measurement curve $M_s$, and hence cannot exceed the peak voltage $V_{sp}$. For this reason, the peak voltage $V_{sp}$ at time $t_1$ is stored in the peak hold circuit 53. It takes about 10 minutes for the lowered temperature represented by the curve $H_s$ to return to the original body temperature $T_{b1}$. The reason will be described below with reference to FIG. 13.

When the probe 16 is inserted in the external ear canal 41, all the temperatures of the drum membrane 42, each downy hair 43, and the earwax 44 are decreased. Of these portions, the temperature of the drum membrane 42 can return to the level of the body temperature $T_{b1}$ relatively quickly because of themal conduction from the body. However, since the thermal conduction from the body to each downy hair 43 and the earwax 44 having low degree of adhesion to the body is less, about 10 minutes are required for their temperatures to return to the level of the body temperature $T_{b1}$. Therefore, the temperature in the external ear canal 41 is set at the level of the body temperature $T_{b1}$ only at time $t_1$, i.e., the instant when the probe 16 is inserted. Since the series of operation processing of the radiation clinical thermometer 1 cannot be performed by using the infrared radiation energy in such a short period of time, the peak voltage $V_{sp}$ appearing at the instant is stored in the peak hold circuit 53 as analog data, as indicated by a dotted line in FIG. 16. The A/D conversion and the series of operation processing are performed by using this stored peak voltage $V_{sp}$, thereby performing the body temperature measurement.

Thus, in a radiation clinical thermometer without a preheating unit as in the present invention, the peak hold circuit 53 is indispensable. By using the peak hold circuit 53, the body temperature $T_{b1}$ at time $t_1$ can be measured within a very short period of time.

Figure 17:
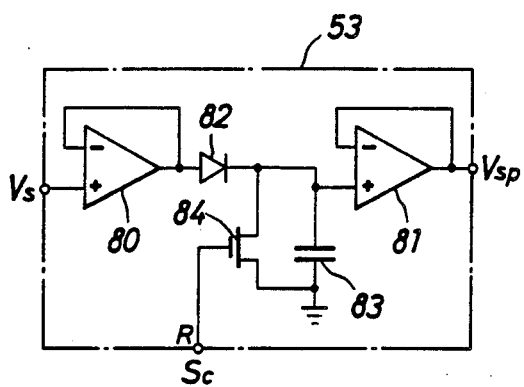
FIG. 17 is a circuit diagram of a peak hold circuit in the embodiment shown in FIG. 14.

FIG. 17 a detailed arrangement of the peak hold circuit 53. The peak hold circuit 53 comprises an input buffer 80, an output buffer 81, a diode 82 for preventing a reverse current flow, a signal charging capacitor 83, and a switching transistor 84 for causing the capacitor 83 to discharge a charged voltage. The peak hold circuit 53 receives the infrared voltage $V_s$ and outputs its peak value as the peak voltage $V_{sp}$. In addition, when the switching transistor 84 is turned on by the check signal $S_c$ supplied to the reset terminal R, the circuit 53 causes the capacitor 83 to discharge a charged voltage.

Figure 18:
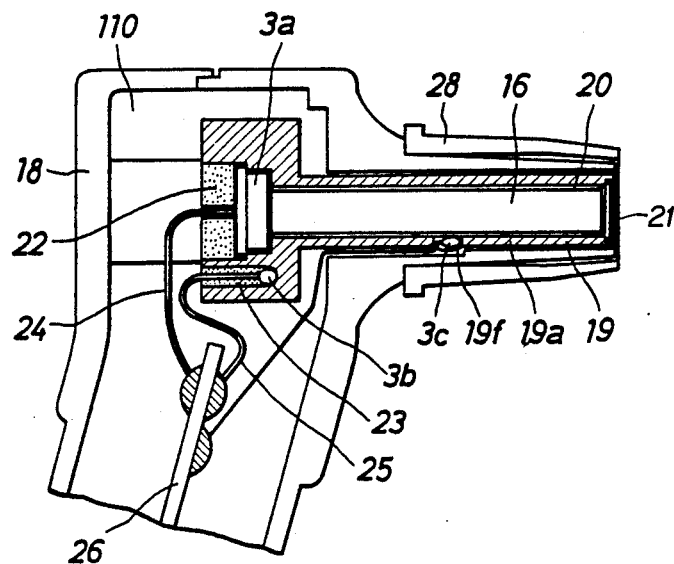
FIG. 18 is a sectional view showing an internal structure of a temperature measuring section of an electronic clinical thermometer according to a third embodiment of the present invention.

FIG. 18 is a sectional view of a head portion 110 according to a third embodiment of the present invention. The same reference numerals in FIG. 18 denote the same parts as in FIG. 10, and a description thereof will be omitted.

The head portion in FIG. 18 differs from that in FIG. 10 in that a through hole 19f is formed in a cylindrical portion 19a of a metal housing 19 so as to expose an optical guide 20, and a temperature-sensitive sensor 3c is fixed to the exposed portion of the optical guide 20. This temperature-sensitive sensor 3c is identical to the temperature-sensitive sensor 3b, and is also fixed by a molding resin.

The third embodiment differs from the second embodiment in a system for correcting thermal equilibrium in a probe 16. The second embodiment employs the system of permitting measurement upon confirmation of thermal equilibrium by the function check mode. In this system, measurement is inhibited while thermal equilibrium is not established. In contrast to this, the third embodiment comprises the two temperature-sensitive sensors 3b and 3c to detect a temperature difference between an infrared sensor 3a and the optical guide 20. In this system, if this temperature difference is excessively large, measurement is inhibited. If it is smaller than a predetermined value, body temperature measurement is permitted even though thermal equilibrium is not established. In this case, body temperature data is calculated by adding a correction value based on the temperature difference to the measurement value, thus widening the range of measurement conditions of the radiation clinical thermometer.

Figure 19:
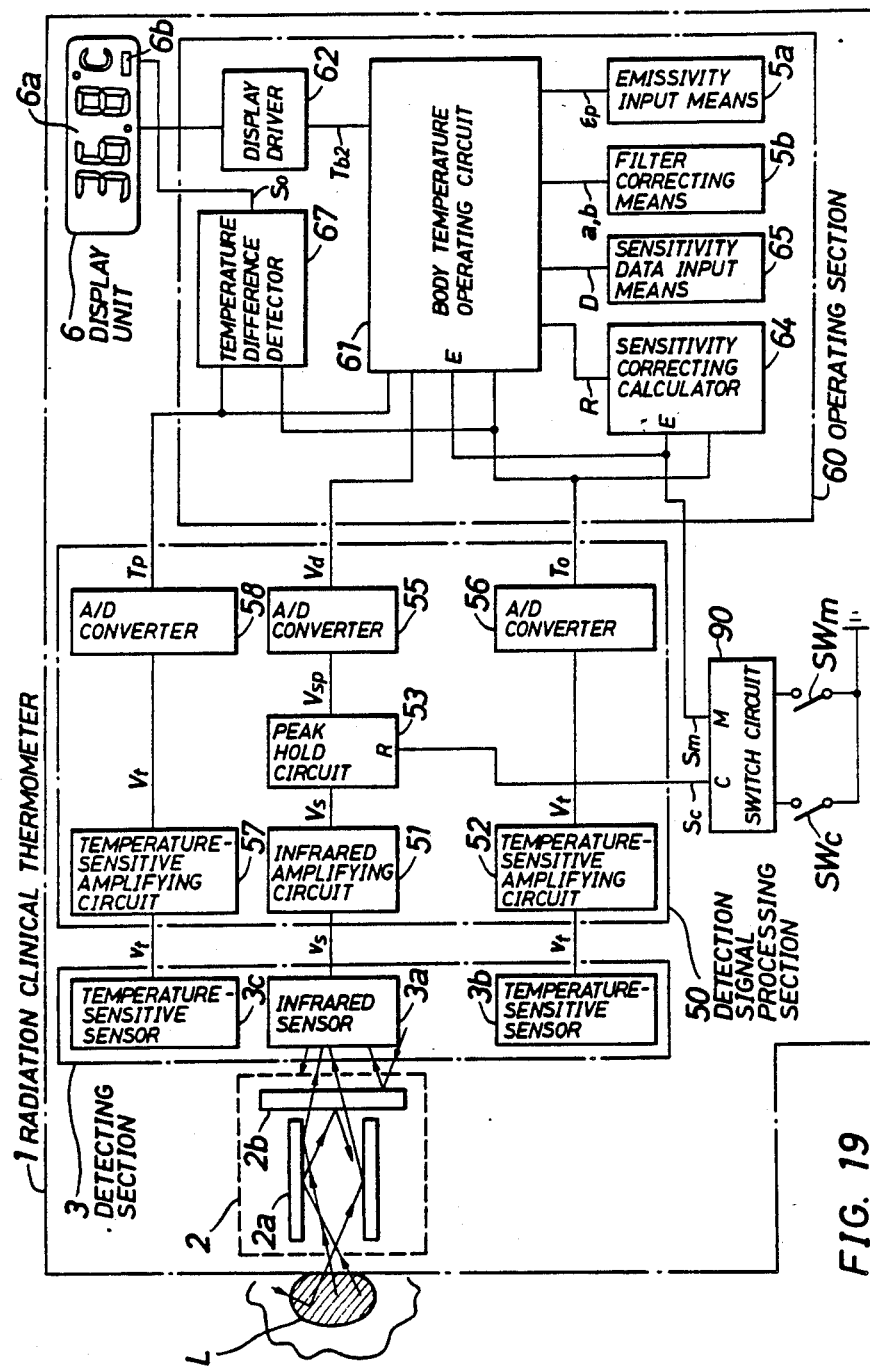
FIG. 19 is a block diagram showing a circuit arrangement of the electronic clinical thermometer according to the third embodiment of the present invention.

The circuit arrangement and operation of the radiation clinical thermometer of the third embodiment will be described below with reference to FIG. 19. The same reference numerals in FIG. 19 denote the same parts as in FIG. 14, and a description thereof will be omitted.

As shown in FIG. 18, a detecting section 3 comprises a temperature-sensitive sensor 3c for measuring a temperature $T_p$ of the optical guide 20. In the detection signal processing section 50, the switching circuit 54 is omitted, and an output voltage $V_{sp}$ from a peak hold circuit 53 is directly supplied to an A/C converter 55. A temperature-sensitive amplifying circuit 57 and an A/D converter 58 are additionally arranged in the section 50 so as to output the temperature-sensitive data $T_p$.

In an operating section 60, an emissivity $\epsilon_p$ of the optical guide 20 is set in an emissivity input means 5a, and a temperature difference detector 67 is arranged in place of the zero detector 67 shown in FIG. 1. The temperature difference detector 67 receives temperature data $T_0$ of the infrared sensor 3a detected by the two temperature-sensitive sensors 3b and 3c and the temperature data $T_p$ of the optical guide 20, and performs temperature difference determination with respect to a predetermined measurement limit temperature difference $T_d$. If $|T_0-T_p|<T_d$, i.e., the temperature difference is smaller than the limit temperature difference, the detector 67 outputs a detection signal $S_0$ so as to illuminate a measurement permission mark 6b of a display unit 6. This temperature difference determination is continued while the power switch 13 shown in FIG. 9 is turned on. Therefore, the operation of the check button 12 as in the second embodiment is not required.

When the measurement permission mark 66 is illuminated, a body temperature measurement mode is set in the same manner as in the second embodiment. However, the difference is that the temperature-sensitive data $T_p$ of the optical guide 20 is supplied to a body temperature operating circuit 61 in addition to the respective data described with reference to FIG. 14. In this embodiment, the circuit 61 calculates body temperature data $T_{b2}$ in accordance with the following equation (19):

$$T_{b2} = \sqrt[4]{\frac{V_d/K_4 - \{\epsilon_p/(1-\epsilon_p)\}(T_p-b)^4 + \{\epsilon_p/(1-\epsilon_p)^4\}(T_0-b)^4 + b}} \quad (19)$$

where b=45.95[K] and $\epsilon_p=0.05$. This body temperature data $T_{b2}$ is obtained by correcting the temperature difference by the arithmetic operations described above, and is displayed on a body temperature display portion 6a of the display unit 6. Furthermore, in this embodiment, a check signal $S_c$ output from a switch circuit 90 resets only the peak hold circuit 53. Therefore, when re-measurement of a body temperature is to be performed, the peak hold circuit 53 must be reset first by operating the check button after illumination of the measurement permission mark 6b is confirmed.

As described above, according to this embodiment, since body temperature measurement can be performed without waiting for perfect thermal equilibrium of the respective elements of the probe 16, intervals of repetitive measurements can be reduced. In addition, since the function check using infrared radiation is not required, a switching circuit and a storage case are not required so that the arrangement can be simplified.

Figure 20:
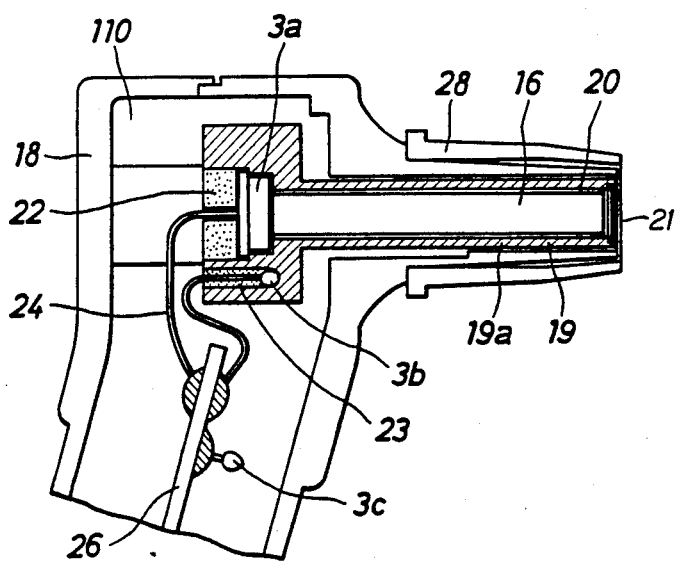
FIG. 20 is a sectional view showing an internal structure of a modification of the temperature measuring section of the electronic clinical thermometer according to the third embodiment of the present invention shown in FIG. 18.

In this embodiment, as an optimal embodiment, the arrangement wherein the second temperature-sensitive sensor 3c is attached to the optical guide 20 is shown. However, the present invention is not limited to this. More specifically, the second temperature-sensitive sensor 3c is designed to detect the surface temperature of the optical guide 20 which responds to an ambient temperature more sensitively than the portion in which the temperature-sensitive sensor 3b is embedded. In consideration of the fact that the surface temperature of the optical guide 20 is substantially equal to the ambient temperature, the temperature-sensitive sensor 3c may be mounted on a circuit board on which a measurement IC chip is mounted as shown in FIG. 20 so as to measure an ambient temperature, so that the measured ambient temperature is used as the surface temperature of the optical guide 20. This arrangement can also be satisfactorily used in practice.

As has been described above, according to the present invention, a filter correction value and a sensitivity correction value are supplied to a body temperature operating circuit to calculate body temperature data, so that high measurement precision can be realized without using a heating unit as in the conventional thermometer, thus realizing a compact, low-cost radiation clinical thermometer which can be driven by a small battery and which can shorten a measurement time.

In addition, by employing a peak hold circuit for analog data in the radiation clinical thermometer, instantaneous measurement can be performed, thus preventing a measurement disable state due to a temperature drop of a portion to be measured upon insertion of a probe.

Moreover, by employing a temperature difference correcting system using two temperature-sensitive sensors, re-measurement intervals can be shortened, and the problem of thermal equilibrium of a probe, which narrows the range of measurement conditions of the radiation clinical thermometer, can be solved. Therefore, the present invention is very effective to widely use a radiation clinical thermometer as a home thermometer, which has been used exclusively for a medical instrument.

What is claimed is:

1. A radiation clinical thermometer comprising:
   a probe including an optical system constituted by focusing means for focusing infrared radiation from an object to be measured and a filter having transmission wavelength characteristics, an infrared sensor for converting infrared radiation energy into an electrical signal, and a temperature-sensitive sensor for measuring a temperature of said infrared sensor and an ambient temperature thereof;
   detection signal processing means for receiving electrical signals from said infrared sensor and said temperature-sensitive sensor and outputting the electrical signals as digital infrared data and temperature-sensitive data, respectively;
   body temperature operating means for calculating body temperature data; and
   a display unit for displaying a body temperature in accordance with the body temperature data, including filter correcting means for setting a correction value based on the transmission wavelength characteristics of said filter, wherein said body temperature operating means receives the infrared data, the temperature-sensitive data, and the correction value from said filter correcting means so as to calculate body temperature data.

2. A thermometer according to claim 1, further comprising sensitivity correction calculating means for receiving the temperature-sensitive data and calculating sensitivity data of said infrared sensor, and wherein said body temperature operating means calculates the body temperature data by receiving the infrared data, the temperature-sensitive data, the correction value from said filter correcting means, and the sensitivity data from said sensitivity correction calculating means.

3. A thermometer according to claim 2, wherein said sensitivity correction calculating means calculates sensitivity data R according to the following equation:

$$R=\alpha\{1+\beta(T_0-T_m)\}$$

where $T_0$ is sensitivity data of said temperature-sensitive sensor, $T_m$ is a temperature at the time of sensitivity adjustment, $\alpha$ is a sensitivity at the temperature $T_m$, and $\beta$ is a coefficient of variation of sensitivity.

4. A thermometer according to claim 1, wherein said filter correcting means outputs a symmetrical axis temperature correction value which is used to change a symmetrical axis temperature of a temperature-radiation energy characteristic curve represented by a temperature equation of a higher degree approximated to a temperature-radiation energy characteristic curve based on a Stefan-Boltzmann law.

5. A thermometer according to claim 1, wherein said probe comprises an optical guide for focusing infrared radiation energy, a filter member arranged at one end of said optical guide, an infrared sensor arranged at the other end of said optical guide, and a temperature-sensitive sensor arranged near said infrared sensor, said optical guide, said filter member, said infrared sensor, and said temperature-sensitive sensor being coupled to each other by a metal housing having a high thermal conductivity.

6. A thermometer according to claim 5, wherein said metal housing is an integrally formed housing comprising a cylindrical portion in which said optical guide is inserted and a base portion formed at one end of said cylindrical portion and having a storage recess for housing said infrared sensor and said temperature-sensitive sensor, said optical guide being inserted and fixed in said cylindrical portion, said infrared sensor and said temperature-sensitive sensor being embedded in said storage recess of said base portion with a molding resin.

7. A thermometer according to claim 5, further comprising a second temperature-sensitive sensor for detecting a surface temperature of said optical guide.

8. A thermometer according to claim 7, further comprising said second temperature-sensitive sensor arranged on a surface of said optical guide in tight contact therewith.

9. A thermometer according to claim 7, wherein said detection signal processing section comprises an A/D converter for converting an electrical signal from said second temperature-sensitive sensor into second digital temperature-sensitive data, and said body temperature operating means calculates the body temperature data by using the second temperature-sensitive data as one of input signals.

10. A thermometer according to claim 9, further comprising a temperature difference detector for receiving the temperature-sensitive data from said temperature-sensitive sensor arranged at said base protion of said probe and the second temperature-sensitive data from said second temperature-sensitive sensor, and wherein said temperature difference detector outputs a detection signal when a temperature difference is determined to be smaller than a predetermined measurement limit temperature difference.

11. A thermometer according to claim 10, wherein said display unit comprises a measurement permission mark adapted to be illuminated by the detection signal output from said temperature difference detector.

12. A radiation clinical thermometer comprising:
a probe including an optical means for focusing infrared radiation from an object to be measured, an infrared sensor for converting infrared radiation energy into an electrical signal, and a temperature-sensitive sensor for measuring a temperature of said infrared sensor and an ambient temperature thereof;
detection signal processing means for receiving electrical signals from said infrared sensor and said temperature-sensitive sensor and outputting the electrical signals as digital infrared data and temperature-sensitive data, respectively;
body temperature operating means for calculating body temperature data, and
a display unit for displaying a body temperature in accordance with the body temperature data, characterized by
a zero detector for receiving the infrared data output from said detection signal processing means and determining presence/absence of the infrared data, wherein said zero detector outputs a detection signal when the infrared data is determined to be zero or a small value.

13. A thermometer according to claim 12, further comprising a storage case for storing said radiation clinical thermometer and a reflecting plate arranged in said storage case at a position corresponding to a probe end of said radiation clinical thermometer stored in said storage case.

14. A thermometer according to claim 13, wherein said display unit comprises a measurement permission mark adapted to be illuminated by the detection signal output from said zero detector.

15. A radiation clinical thermometer comprising:
a probe including an optical means for focusing infrared radiation from an object to be measured, an infrared sensor for converting infrared radiation energy into an electrical signal, and a temperature-sensitive sensor for measuring a temperature of said infrared sensor and an ambient temperature thereof;
detection signal processing means for receiving electrical signals from said infrared sensor and said temperature-sensitive sensor and outputting the electrical signals as digital infrared data and temperature-sensitive data, respectively;
body temperature operating means for calculating body temperature data; and
a display unit for displaying a body temperature in accordance with the body temperature data, wherein said detection signal processing means includes a peak holding circuit for holding a peak value of the electrical signal from said infrared sensor as analog data and an A/D converter for converting a peak value voltage held in said peak holding circuit into digital infrared data, and said body temperature operating means calculates the body temperature data by using the infrared data converted from the peak value voltage; and
wherein said probe including a filter having transmission wavelength characteristics and wherein said display unit includes filter correcting means for setting a correction value based on the transmission wavelength characteristics of said filter, wherein said body temperature operating means receives the infrared data, the temperature-sensitive data, and the correction value from said filter correcting means so as to calculate body temperature data.

16. A thermometer according to claim 15 wherein said filter correcting means outputs a symmetrical axis temperature correction value which is used to change a symmetrical access temperature of a temperature-radiation energy characteristic curve represented by a temperature equation of a higher degree approximated to a temperature-radiation energy characteristic curve based on a Stefan-Boltzmann law.

17. A thermometer according to claim 15 wherein said probe includes a filter having transmission wavelength characteristics and wherein said display unit includes filter correcting means for setting a correction value based on the transmission wavelength characteristics of said filter and further comprising sensitivity correction calculating means for receiving the temperature-sensitive data and calculating sensitive data of said infra-red sensor and wherein said body temperature operating means calculates the body temperature data by receiving the infra-red data, the temperature-sensitive data, the correction value from said filter correcting means, and the sensitivity data from said sensitivity correction calculating means.

18. A thermometer according to claim 17, wherein said sensitivity correction calculating means calculates sensitivity data R according to the following equation:

$$R = \alpha \{1 + \beta(T_0 - T_m)\}$$

where $T_0$ is sensitivity data of said temperature-sensitive senor, $T_m$ is the temperature at the time of sensitivity adjustment, $\alpha$ is a sensitivity at the temperature $T_m$, and $\beta$ is a coefficient of variation of sensitivity.

19. A thermometer according to claim 15, wherein said optical means comprises an optical guide, a filter member arranged at one end of said optical guide, said infrared sensor arranged at the other end of said optical guide, and a temperature-sensitive sensor arranged near said infrared sensor, said optical guide, said filter member, said infrared sensor, and said temperature-sensitive sensor being coupled to each other by a metal housing having a high thermal conductivity.

20. A thermometer according to claim 19, wherein said metal housing is an integrally formed housing comprising a cylindrical portion in which said optical guide is inserted and a base portion formed at one end of said cylindrical portion and having a storage recess for housing said infrared sensor and said temperature-sensitive sensor, said optical guide being inserted and fixed in said cylindrical portion, said infrared sensor and said temperature-sensitive sensor being embedded in said storage recess of said base portion with a molding resin.

21. A thermometer according to claim 15, wherein said display unit includes a zero detector for receiving the infrared data output from said detection signal processing means and determining presence/absence of the infrared data, wherein said zero detector outputs a detection signal when the infrared data is determined to a zero or a small value.

22. A thermometer according to claim 15, further comprising a storage case for storing said radiation clinical thermometer and a reflecting plate arranged in said storage case at a position corresponding to a probe end of said radiation clinical thermometer stored in said storage case.

23. A thermometer according to claim 22, wherein said display unit comprises a zero detector and a measurement permission mark adapted to be illuminated by detection signal output from said zero detector.

* * * * *